(12) United States Patent
Grotendorst et al.

(10) Patent No.: US 6,752,402 B2
(45) Date of Patent: Jun. 22, 2004

(54) LEVEL CONTROL SYSTEM FOR A MOTOR VEHICLE

(75) Inventors: Jörg Grotendorst, Garbsen (DE); Oliver König, Hannover (DE); Marc Nettelmann, Garbsen (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 10/024,703

(22) Filed: Dec. 21, 2001

(65) Prior Publication Data
US 2002/0079626 A1 Jun. 27, 2002

(30) Foreign Application Priority Data
Dec. 21, 2000 (DE) ......................................... 100 64 395

(51) Int. Cl.[7] .............................. B60G 11/26; B60S 9/10
(52) U.S. Cl. .............................. 280/6.152; 280/6.151; 280/6.16; 280/5.514; 280/5.507
(58) Field of Search ........................... 280/5.501, 5.502, 280/5.514, 5.507, 5.508, 6.152, 6.16, 6.151; 701/37, 38; 340/442

(56) References Cited

U.S. PATENT DOCUMENTS

| | | | | |
|---|---|---|---|---|
| 4,640,331 A | * | 2/1987 | Braun et al. | 152/417 |
| 4,677,263 A | * | 6/1987 | Hamilton et al. | 200/61.44 |
| 4,763,709 A | * | 8/1988 | Scholer | 152/416 |
| 5,273,308 A | * | 12/1993 | Griffiths | 280/6.151 |
| 5,344,189 A | * | 9/1994 | Tanaka et al. | 280/6.152 |
| 5,430,647 A | * | 7/1995 | Raad et al. | 701/38 |
| 5,452,919 A | * | 9/1995 | Hoyle et al. | 280/5.514 |
| 5,517,847 A | * | 5/1996 | Campbell et al. | 73/11.07 |
| 5,573,266 A | * | 11/1996 | Zalewski et al. | 280/6.151 |
| 5,587,698 A | * | 12/1996 | Genna | 340/442 |
| 5,700,026 A | * | 12/1997 | Zalewski et al. | 280/6.152 |
| 6,144,295 A | * | 11/2000 | Adams et al. | 340/442 |
| 6,445,287 B1 | * | 9/2002 | Schofield et al. | 340/442 |

FOREIGN PATENT DOCUMENTS

| | | |
|---|---|---|
| DE | 35 42 975 | 6/1987 |
| DE | 198 35 491 | 2/2000 |
| DE | 199 02 049 | 8/2000 |
| JP | 59 195411 | 3/1985 |
| JP | 1-95921 | 7/1987 |
| JP | 01 052517 | 6/1989 |

OTHER PUBLICATIONS

"ECAS—Electronically Controlled Air Suspension for Commercial Vehicles" WABCO Westinghouse Fahrzeuqbremsen, Hannover, 1992.

"New Range Rover—Electrical Troubleshooting Manual" Rover Group Limited 1995, Publication Part No LRL 0006ENG.

* cited by examiner

Primary Examiner—Paul N. Dickson
Assistant Examiner—George D. Spisich
(74) Attorney, Agent, or Firm—Walter Ottesen

(57) ABSTRACT

A level control system for a motor vehicle having a vehicle body includes a plurality of air springs which can be filled or discharged with pressurized air to control the level of the vehicle body. A first control apparatus controls the functions of filling and discharging the air springs in dependence upon the level of the vehicle body. A communications channel interconnects the first control apparatus to a second control apparatus. A switch triggers an additional function in the level control system and this switch is movable between a first switching state and a second switching state. The switch is connected to the second control apparatus and the second control apparatus functions to transmit a signal sequence via the communications channel to the first control apparatus when the switch is transferred from the first switching state into the second switching state. The first control apparatus operates to carry out the additional function when the first control apparatus receives the signal sequence.

10 Claims, 1 Drawing Sheet

LEVEL CONTROL SYSTEM FOR A MOTOR VEHICLE

FIELD OF THE INVENTION

The invention relates to a level control system for a motor vehicle having air springs which can be filled with pressurized air or vented (discharged) to control the level of a vehicle body. The level control system includes a control apparatus which controls (open loop or closed loop) the functions of filling and discharging in dependence upon the level of the vehicle body.

BACKGROUND OF THE INVENTION

Level control systems of this kind are known from the state of the art for some time and are described, for example, in U.S. Patent Nos. 4,809,957 and 6,332,623. In recent times, more and more, the wish has been expressed by the motor vehicle industry that such control systems should not be used exclusively for controlling the level of the vehicle body (that is, to fill and discharge the air springs) but also for realizing additional functions. One of these functions comprises especially that a reserve or spare tire be fillable by means of a pressurized air source of the level control system via a tire fill connection. This additional function of the level control system makes it possible to configure the reserve wheel as a folding wheel so that less structural space is needed than with a conventional reserve wheel. The savings of structural space is especially advantageous in modern motor vehicles because the structural space available therein becomes ever less. Further additional functions such as preventing the inclination of the motor vehicle when the door is open are conceivable. The additional functions should be triggered via switches which can be actuated either by the driver of the motor vehicle or automatically.

The control apparatus of a conventional level control system is so configured that the function of a level control can be controlled without difficulty thereby. The triggering of additional functions via switches is, however, not easily possible with this control apparatus (for example, the triggering of the above-mentioned function "spare wheel filling"). This is so because additional functions up to now are not provided for and the control apparatus is not designed therefor. Difficulties occur especially when several additional functions are to be integrated into a conventional control apparatus of a level control system.

SUMMARY OF THE INVENTION

It is an object of the invention to make a level control system of the kind described above accessible in a simple manner for additional functions.

The level control system of the invention is for a motor vehicle having a vehicle body. The level control system includes: a plurality of air springs which can be filled or discharged with pressurized air to control the level of the vehicle body; a first control apparatus for controlling the functions of filling and discharging the air springs in dependence upon the level of the vehicle body; a second control apparatus; a communications channel for interconnecting the first and second control apparatus; at least one switch for triggering an additional function in the level control system; the switch being movable between a first switching state and a second switching state; the switch being connected to the second control apparatus and the second control apparatus functioning to transmit a signal sequence via the communications channel to the first control apparatus when the switch is transferred from the first switching state into the second switching state; and, the first control apparatus operating to carry out the additional function when the first control apparatus receives the signal sequence.

The invention utilizes the situation that additional control apparatus are anyway present in the motor vehicle and have additional available connections for one or several switches (for example, the control apparatus for the on-board power supply of the motor vehicle).

The advantage achieved with the invention is especially that a level control system (whose control apparatus is designed exclusively for triggering the functions of filling and discharging the air springs and especially has no additional connections for switches for triggering additional functions) can be made accessible in a simple manner for additional functions. It is especially possible to use already specified control apparatus of level control systems which do not per se make possible a triggering of additional functions via switches. Furthermore, a retrofit of existing level control systems with additional functions is possible in a simple manner even when the control apparatus of the level control systems are not suitable for triggering additional functions.

According to a feature of the invention, the additional or second control apparatus is connected to several switches and the respective signal sequences, which indicate a transfer of a switch from a first state into the second state, are different from each other. The advantage of this feature is that the control apparatus of the level control system can detect from the signal sequence which additional function is to be triggered in the level control system.

According to another feature of the invention, the additional control apparatus is connected to a switch for triggering a filling of a reserve wheel by at least one pressure source of the level control system. When this switch is transferred from a first state into a second state, a corresponding signal frequency is transmitted from the additional control apparatus to the control apparatus of the level control system and the additional function "reserve wheel filling" is executed there.

According to another feature of the invention, the switch for triggering the filling of the reserve wheel is actuated via a switchable directional valve, which prevents the filling of a reserve tire via a tire fill connection in a base state of the valve and makes possible the filling of the reserve wheel via the tire fill connection in the switched state of the valve. The switch is in its first switching state when the directional valve is in its base state and is transferred into the second switching state when the directional valve is transferred into its switched state. Preferably, the switchable directional valve is actuated directly by the driver of the motor vehicle when the driver wants to fill the reserve wheel (for example, via a switch in the dashboard). The advantage of this feature is that the switchable directional valve need not be driven by the control apparatus of the level control system so that no separate drive channel need be made available (in this way, even conventional control apparatus of level control systems can be used even when these control apparatus are unable to provide a corresponding drive channel).

According to still another feature of the invention, the additional control apparatus is connected to respective switches on the doors of the vehicle which indicate whether the corresponding door is open or closed. The advantage of this feature becomes understandable when one considers the following: when a door of the motor vehicle is opened and the body of the vehicle is at the same time inclined, it can happen that the door strikes the ground and is damaged. When the control apparatus of the level control system receives a signal sequence which indicates which door of the vehicle is open, then, with the aid of the level control system, a possible inclined position of the motor vehicle can be compensated which otherwise could lead to damage of the door (with a switch for a door of the motor vehicle, the additional function "check of the inclined position of the vehicle body and, if required, compensation thereof" is triggered). The advantage of this feature is therefore that damage of the doors of the vehicle can be substantially avoided.

According to another feature of the invention, the additional control apparatus is connected to a switch for the trunk lid or rear door, which indicates whether the lid or door is open or closed. The advantage of this feature is that the control apparatus of the level control system can undertake a lowering of the vehicle body at least in the region of the trunk lid when it is indicated to the control apparatus that the trunk lid is open and that the vehicle body has exceeded a specific level (accordingly, with the switch for the trunk lid of the vehicle, the additional function is triggered, namely, the function of "check of the level of the vehicle body and, if necessary, lower in the region of the trunk lid"). In this way, damage to the trunk lid can be substantially avoided (for example, damage because of a collision of the trunk lid against the roof of the garage).

According to another feature of the invention, an additional function can be carried out by the control apparatus of the level control system as long as the switch, which triggers the corresponding function, is disposed in its second state. The advantage of this feature for a switch, which is actuated by the driver of the vehicle (as this can be the case, for example, for the switch for the filling of the reserve wheel), is seen in that the vehicle driver can determine how long the function is to be carried out (that is, how long, for example, the reserve wheel is filled. This is especially advantageous when the reserve wheel is intended to only be partially filled or when a reserve wheel not part of the vehicle or another item is to be filled).

According to another embodiment of the invention, an additional function is carried out by the control apparatus of the level control system over a limited time span. It can happen (for example, because of a short circuit in the switch) that an additional function is triggered in error. The advantage of this feature is that the execution of the additional function is interrupted after the elapse of the time span and thereby damage of the level control system is substantially avoided (for example, by too long a running time of the compressor of the level control system when the additional function "reserve wheel filling" is triggered erroneously). It is likewise possible to combine the above two features with each other, that is, an additional function can be carried out as long as the corresponding switch is disposed in its second switching state; however, the procedure can be interrupted after a limited time (when the switch is still in the second switching state).

The communications channel, which connects the additional control apparatus and the control apparatus of the level control system to each other, can be configured in parallel. According to a further advantageous feature of the invention, the communications channel is however configured serially. An advantage of this embodiment is that a series communications channel can be realized especially simply and at low cost. Furthermore, the data transmission via a serial communications channel is sufficiently rapid for the present invention because only small quantities of data need be transmitted over the transmission channel.

BRIEF DESCRIPTION OF THE DRAWINGS

The invention will now be described with respect to the single FIGURE (FIG. 1) of the drawing which shows a schematic of a level control system according to the invention.

DESCRIPTION OF THE PREFERRED EMBODIMENTS OF THE INVENTION

Figure 1:
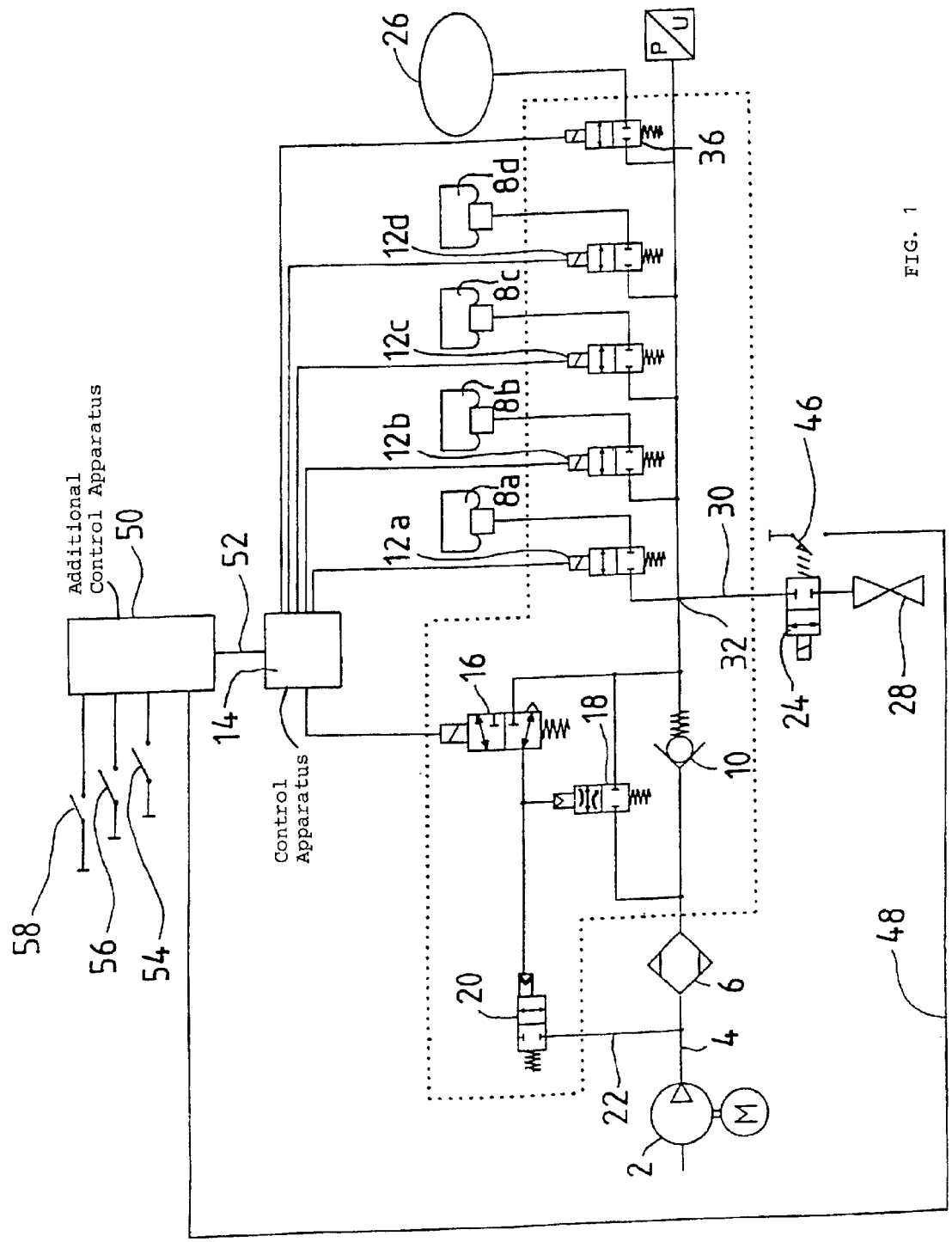

FIG. 1 shows a level control system having a compressor 2 which is connected via a pressurized air line 4 to an air dryer 6. Each air spring (8a to 8d) of the level control system can be filled with pressurized air with the aid of the compressor 2 via the air dryer 6 and a check valve 10 and via electrically controllable directional valves 12a to 12d, respectively. The check valve 10 opens toward the air springs 8a to 8d and the directional valves 12a to 12d are assigned to corresponding ones of the air springs. For this purpose, the directional valves 12a to 12d, which are assigned to corresponding ones of the air springs 8a to 8d, are driven by the control apparatus 14 of the level control system and are transferred from the base state shown in FIG. 1 into the other switched state. Furthermore, the compressor 2 is driven by the control apparatus 14 so that the compressor starts to run.

For emptying an air spring 8a to 8d, a corresponding directional valve 12a to 12d is, in turn, transferred by the control apparatus 14 from the base state into the switched state. Furthermore, the electrically controllable directional valve 16 is transferred by the control apparatus 14 from the base state, which is shown in FIG. 1, into its switched state. Then, pressurized air from the air springs 8a to 8d reaches the pneumatic control inputs of the pneumatically controllable directional valves 18 and 20 via the directional valve 16 so that the directional valves 18 and 20 can transfer from the base state, which is shown in FIG. 1, into their switched state. The pressurized air line 22, which branches from the pressurized air line 4, is then connected via the pneumatically controllable directional valve 20 to the atmosphere. Pressurized air can be released into the atmosphere from the air springs 8a to 8d via the directional valves 12a to 12d, the pneumatically controllable directional valve 18, the air dryer 6, and the pneumatically controllable directional valve 20.

In addition to the components referred to above, the level control system includes a pressurized air store 26. The pressurized air store 26 can be filled with pressurized air with the aid of the compressor 2 via the air dryer 6, the check valve 10 and the electrically controllable directional valve 36. For this purpose, the electrically controllable directional valve 36 is transferred by the control apparatus 14 from the base position shown in FIG. 1 into the switched position and the compressor is driven so that it starts to run. With the aid of the pressurized air store, an air spring 8a to 8d can be filled with pressurized air via the directional valves 36 and 12a to 12d. In this case, the corresponding directional valves are driven by the control apparatus 14 so that they transfer from the base state into the switched state.

The usual functions of filling and emptying the air springs 8a to 8d (filling the pressurized air store 26 and filling the air springs 8a to 8d from the pressurized air store) are controlled exclusively by the control apparatus 14 of the level control system (that is, without any external driving). In the level control system, additional functions can, however, be carried out in addition which will be explained hereinafter.

One of the additional functions is, for example, the filling of the reserve wheel via a tire fill connection 28 which lies in a pressurized line 30 and which branches from the pressurized line 4 at point 32, which, seen from the compressor 2, lies rearward of the check valve 10. A controllable directional valve 24 is disposed in the pressurized air line 30 and this directional valve blocks the pressurized air line 30 in the base state shown in FIG. 1 and clears the pressurized air line 30 in its switched state.

As may be required, a reserve wheel (not shown) can be connected to the tire fill connection 28, for example, and can be filled as described below. First, the controllable directional valve 24 is transferred from the base state shown in FIG. 1 into its switched state wherein it clears the pressurized air line 30. The transfer of the directional valve 24 into its switched state takes place via the driver of the vehicle. For this purpose, the directional valve 24 is configured either as an electrically controllable directional valve and is, for example, driven via a switch in the dashboard of the vehicle. Alternatively, it is possible to configure the directional valve 24 as a directional valve which is to be actuated mechanically and which is transferred into its switched state with the aid of a switch lever, et cetera.

Because of the transfer into the switched state, the controllable directional valve 24 transfers a switch 46 from a first switched state (wherein the switch 46 is opened) into a second switched state (wherein the switch 46 is closed), whereupon a signal is transmitted via the signal line 48 to an additional control apparatus 50 (for example, the control apparatus of the on-board power supply). Alternatively, it is possible to do without switch 46. (In this case, the switch with which the switchable directional valve 24 is driven, is utilized in correspondence to switch 46.) When the control apparatus 50 receives this signal, the control apparatus transmits a signal sequence to the control apparatus 14 of the level control system via a serial communications channel 52. The control apparatus 14 evaluates the signal sequence and recognizes that the additional function "reserve wheel filling" is to be carried out. In order to carry out this function, the control apparatus 14 drives the compressor 2 of the level control system so that the compressor can fill the reserve wheel (not shown) via the air dryer 6, the check valve 10, the controllable directional valve 24 and the tire fill connection 28. At the same time, or alternatively, the reserve wheel can be filled with pressurized air from the pressurized air store 26 in order to execute the function "reserve wheel filling". For this purpose, the electrically controllable directional valve 36 is driven by the control apparatus 14 so that the directional valve transfers from the base state, which is shown in FIG. 1, into its switched state. The reserve wheel is then connected via the controllable directional valves 36 and 24 and the tire fill connection 28 to the pressurized air store 26.

The function "reserve wheel filling" is carried out by the control apparatus 14 of the level control system as long as the switch 46 (or, the switch with which the directional valve 24 is driven) is in its second switched state, that is, the function is interrupted when the switch 46 (or, the switch with which the directional valve 24 is driven) is transferred from its second switched state again into its first switched state. Alternatively, it is possible that the function "reserve wheel filling" is carried out only over a limited time span by the control apparatus 14 of the level control system independently of the switching state of the switch 46 (or, of the switch with which the directional valve 24 is driven). The limited time span is so dimensioned that the reserve wheel, which belongs to the motor vehicle, can be completely filled.

The above description makes clear that the additional function "reserve wheel filling" is triggered exclusively by an external switch which drives the directional valve. After the switch has triggered the additional function, all control functions, which are needed to carry out the additional function, are taken over by the control apparatus 14 of the level control system. The components, which are driven by the control apparatus 14 of the level control system to carry out the additional function, are exclusively components which are anyway present in the level control system and are utilized to carry out the conventional functions (see above).

The additional control apparatus 50 is connected to further switches 54, 56 and 58 in addition to the switch 46. In the open state, the switch 54 indicates an opening of the left front door of the motor vehicle and, in the closed state, a closed left front door of the motor vehicle. The switch 56 indicates the same for the right front door of the motor vehicle (in a four-door vehicle, additional switches can be provided for the rear doors). In the open state, the switch 58 indicates an open trunk lid and, in the closed state, a closed trunk lid.

When the switch 54 is closed, it is in a first switching state and the left front door of the motor vehicle is closed. When the left front door of the motor vehicle is opened, the switch 54 is also opened and therefore is transferred into its second switching state. The additional control apparatus 50 then receives a corresponding signal and transmits a corresponding signal sequence via the communications channel 52 to the control apparatus 14 of the level control system which indicates that the switch 54 has been transferred into its second switching state. The control apparatus 14 of the level control system then executes the function "check the inclined position of the motor vehicle and, if necessary, correct the inclined position"; that is, the control apparatus 14 thereupon checks whether the vehicle body of the motor vehicle is inclined such that damage can occur to the door. If this is the case, then the control apparatus 14 controls the level control system by filling or discharging the air springs 8a to 8d such that an inclined position of the vehicle body is corrected. The same procedure is followed when the switch 56 is transferred from its first switching state (in which the right front door of the motor vehicle is closed) into the second switching state or the switch 58 is transferred from its first switching state (in which the trunk lid is closed) into the second switching state.

The interruption of the above-mentioned additional functions (which are triggered by switches 54, 56 and 58) takes place in the same way as explained above in connection with the additional function "reserve wheel filling".

The above description shows that the remaining additional functions are also triggered by the switches 54, 56 and 58. They are carried out exclusively by the control apparatus 14 of the level control system which, for this purpose, drives exclusively components of the level control system which are anyway present for carrying out the usual functions.

The signal sequences, which are transmitted by the additional control apparatus 50 to the control apparatus 14 of the level control system and which indicate a transfer of the switches 46, 54, 56 and 58 from the first switching state into the second switching state and which trigger the additional functions, are different from each other. The control apparatus 14 of the level control system can therefore decide on the basis of the signal sequence which additional function in the level control system is to be carried out and which components of the level control system are to be driven.

It is understood that the foregoing description is that of the preferred embodiments of the invention and that various changes and modifications may be made thereto without departing from the spirit and scope of the invention as defined in the appended claims.

What is claimed is:

1. A level control system for a motor vehicle having a vehicle body, the level control system comprising:

a plurality of air springs which can be filled or discharged with pressurized air to control the level of said vehicle body;

a first control apparatus for controlling the functions of filling and discharging said air springs in dependence upon the level of said vehicle body;

a second control apparatus;

a communications channel for interconnecting said first and second control apparatus;

a first switch for triggering a first additional function in said level control system;

said first switch being movable between a first switching state and a second switching state;

said first switch being connected to said second control apparatus and said second control apparatus functioning to transmit a first signal sequence via said communications channel to said first control apparatus when said first switch is transferred from said first switching state into said second switching state;

said first control apparatus operating to carry out said additional function when said first control apparatus receives said first signal sequence;

a second additional switch for triggering a second additional function;

said second switch being movable between a first switching state and a second switching state;

said second switch being connected to said second control apparatus and said second control apparatus functioning to transmit a second signal sequence via said communications channel to said first control apparatus when said switch is transferred from said first switching state thereof to said second switching state thereof;

said first control apparatus operating to carry out said second additional function when said first control apparatus receives said second signal sequence; and, said first and second signal sequences being distinguishable one from the other.

2. The level control system of claim 1, wherein said level control system includes a pressurized air source; and, said first switch functions to trigger a filling of a reserve wheel of said motor vehicle via said pressurized air source.

3. The level control system of claim 2, further comprising a tire fill connection and a directional valve connected to said tire fill connection; said directional valve being switchable between a base state wherein said directional valve prevents a filling of said reserve wheel and a switched state wherein said directional valve facilitates a filling of said reserve wheel via said tire fill connection; and, said first switch being actuable by said directional valve and being in said first switching state when said directional valve is in said base state and said first switch being in said second switching state when said directional valve is transferred into said switched state.

4. The level control system of claim 1, said first and second switches being assigned to corresponding ones of the doors of said motor vehicle; and, each of said switches functioning to indicate whether the door associated therewith is open or closed.

5. The level control system of claim 1, wherein said first switch is for the trunk lid or rear door of said motor vehicle and indicates whether said trunk lid or rear door is open or closed.

6. The level control system of claim 1, wherein said additional function is carried out by said first control apparatus so long as said first switch is in said second switching state.

7. The level control system of claim 1, wherein said first additional function is carried out by said first control apparatus over a limited time duration.

8. The level control system of claim 1, wherein said communications channel is serially configured.

9. A level control system for a motor vehicle having a vehicle body, the level control system comprising:

a plurality of air springs which can be filled or discharged with pressurized air to control the level of said vehicle body;

a first control apparatus for controlling the functions of filling and discharging said air springs in dependence upon the level of said vehicle body;

a second control apparatus;

a communications channel for interconnecting said first and second control apparatus;

at least one switch for triggering an additional function in said level control system;

said switch being movable between a first switching state and a second switching state;

said switch being connected to said second control apparatus and said second control apparatus functioning to transmit a signal sequence via said communications channel to said first control apparatus when said switch is transferred from said first switching state into said second switching state; and, said first control apparatus operating to carry out said additional function when said first control apparatus receives said signal sequence;

said level control system including a pressurized air source; and, said switch functioning to trigger a filling of a reserve wheel of said motor vehicle via said pressurized air source.

10. The level control system of claim 9, further comprising a tire fill connection and a directional valve connected to said tire fill connection; said directional valve being switchable between a base state wherein said directional valve prevents a filling of said reserve wheel and a switched state wherein said directional valve facilitates a filling of said reserve wheel via said tire fill connection; and, said switch being actuable by said directional valve and being in said first switching state when said directional valve is in said base state and said switch being in said second switching state when said directional valve is transferred into said switched state.

* * * * *